United States Patent
Quint

(10) Patent No.: US 7,433,860 B1
(45) Date of Patent: Oct. 7, 2008

(54) METHOD AND SYSTEM FOR LABELING COMMUNICATIONS CABLES

(75) Inventor: Joe Quint, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 514 days.

(21) Appl. No.: 10/634,456

(22) Filed: Aug. 5, 2003

(51) Int. Cl.
*G06F 7/00* (2006.01)

(52) U.S. Cl. .................... 707/1; 707/2; 707/3; 707/100; 707/104.1; 324/538; 324/539

(58) Field of Classification Search .............. 707/2, 707/3, 4, 5, 6; 324/538, 539
See application file for complete search history.

(56) References Cited

U.S. PATENT DOCUMENTS 5,280,251 A * 1/1994 Strangio .................... 324/539
6,721,414 B1 * 4/2004 Rojas et al. ............. 379/221.01

OTHER PUBLICATIONS

P-touch 2400/2410 User's Guide, Brother®.
User's Guide, Teklynx International Co., 2000.
LabelMark, Labeling Software, V2 User's Guide, Brady®, www.bradyid.com.

* cited by examiner

*Primary Examiner*—Hung Q Pham

(57) ABSTRACT

A method, system, and medium are provided for generating labels to tag cables of a communications network. The includes creating a set of label records to be stored in a storage component; receiving search criteria for retrieving all or a portion of the label records; identifying at least one record in the storage component that corresponds to the search criteria; and providing a data stream that, when rendered by the printing device, produces labels displaying content of the identified records in a predetermined format. The system includes a user interface coupled to a storage component for receiving a search string to query the storage component for one or more records and a label controller that receives the query result and converts the result into a prescribed format whereby the query result can be rendered on a printing device.

14 Claims, 5 Drawing Sheets

| ITEM | CABLE INFORMATION | | | FROM | | | | | TO | | | | NOTES/COMMENTS |
|---|---|---|---|---|---|---|---|---|---|---|---|---|---|
| | CABLE TYPE | NO of RUNS | Ft. per RUN | Rack or Loc. | EQUIPMENT | DESIGNATION | TERMINATION | Rack or Loc. | EQUIPMENT | DESIGNATION | TERMINATION | | |
| 4.57 | TX DS-3 COAX CA #7 WIRE 1 | 1 | | 8121 SHELF 1 | APX 8000 DS3 CARD #1 SDN-AP-Q35DCWASH367C | XMT (OUT) | BNC CONNECTOR | 3101 | DSX-3 BAY | TX (OUT) | PANEL 8 JACK 17 | CHANNELIZED DS3 FOR CUSTOMER ACCESS #1 |
| 4.58 | RX DS-3 COAX CA #7 WIRE 2 | 1 | | 8121 SHELF 1 | APX 8000 DS3 CARD #1 SDN-AP-Q35DCWASH367C | RCV (IN) | BNC CONNECTOR | 3101 | DSX-3 BAY | RX (IN) | PANEL 8 JACK 17 | |
| 4.59 | TX DS-3 COAX CA #7 WIRE 3 | 1 | | 8121 SHELF 1 | APX 8000 DS3 CARD #20 SDN-AP-Q35DCWASH367C | XMT (OUT) | BNC CONNECTOR | 3101 | DSX-3 BAY | TX (OUT) | PANEL 8 JACK 18 | CHANNELIZED DS3 FOR CUSTOMER ACCESS #2 |
| 4.60 | RX DS-3 COAX CA #7 WIRE 4 | 1 | | 8121 SHELF 1 | APX 8000 DS3 CARD #20 SDN-AP-Q35DCWASH367C | RCV (IN) | BNC CONNECTOR | 3101 | DSX-3 BAY | RX (IN) | PANEL 8 JACK 18 | |
| 4.61 | TX DS-3 COAX CA #7 WIRE 5 | 1 | | 8121 SHELF 1 | APX 8000 DS3 CARD #21 SDN-AP-Q35DCWASH367C | XMT (OUT) | BNC CONNECTOR | 3101 | DSX-3 BAY | TX (OUT) | PANEL 8 JACK 19 | CHANNELIZED DS3 FOR CUSTOMER ACCESS #3 |
| 4.62 | RX DS-3 COAX CA #7 WIRE 6 | 1 | | 8121 SHELF 1 | APX 8000 DS3 CARD #21 SDN-AP-Q35DCWASH367C | RCV (IN) | BNC CONNECTOR | 3101 | DSX-3 BAY | RX (IN) | PANEL 8 JACK 19 | |
| 4.63 | TX DS-3 COAX CA #7 WIRE 7 | 1 | | 8121 SHELF 1 | APX 8000 DS3 CARD #40 SDN-AP-Q35DCWASH367C | XMT (OUT) | BNC CONNECTOR | 3101 | DSX-3 BAY | TX (OUT) | PANEL 8 JACK 20 | CHANNELIZED DS3 FOR CUSTOMER ACCESS #4 |
| 4.64 | RX DS-3 COAX CA #7 WIRE 8 | 1 | | 8121 SHELF 1 | APX 8000 DS3 CARD #40 SDN-AP-Q35DCWASH367C | RCV (IN) | BNC CONNECTOR | 3101 | DSX-3 BAY | RX (IN) | PANEL 8 JACK 20 | |
| 4.65 | TX DS-3 COAX CA #8 WIRE 1 | 1 | | 8121 SHELF 2 | APX 8000 DS3 CARD #1 SDN-AP-Q36DCWASH367C | XMT (OUT) | BNC CONNECTOR | 3101 | DSX-3 BAY | TX (OUT) | PANEL 8 JACK 21 | CHANNELIZED DS3 FOR CUSTOMER ACCESS #1 |
| 4.66 | RX DS-3 COAX CA #8 WIRE 2 | 1 | | 8121 SHELF 2 | APX 8000 DS3 CARD #1 SDN-AP-Q36DCWASH367C | RCV (IN) | BNC CONNECTOR | 3101 | DSX-3 BAY | RX (IN) | PANEL 8 JACK 21 | |
| 4.67 | TX DS-3 COAX CA #8 WIRE 3 | 1 | | 8121 SHELF 2 | APX 8000 DS3 CARD #20 SDN-AP-Q36DCWASH367C | XMT (OUT) | BNC CONNECTOR | 3101 | DSX-3 BAY | TX (OUT) | PANEL 8 JACK 22 | CHANNELIZED DS3 FOR CUSTOMER ACCESS #2 |
| 4.68 | RX DS-3 COAX CA #8 WIRE 4 | 1 | | 8121 SHELF 2 | APX 8000 DS3 CARD #20 SDN-AP-Q36DCWASH367C | RCV (IN) | BNC CONNECTOR | 3101 | DSX-3 BAY | RX (IN) | PANEL 8 JACK 22 | |
| 4.69 | TX DS-3 COAX CA #8 WIRE 5 | 1 | | 8121 SHELF 2 | APX 8000 DS3 CARD #21 SDN-AP-Q36DCWASH367C | XMT (OUT) | BNC CONNECTOR | 3101 | DSX-3 BAY | TX (OUT) | PANEL 8 JACK 23 | CHANNELIZED DS3 FOR CUSTOMER ACCESS #3 |
| 4.70 | RX DS-3 COAX CA #8 WIRE 6 | 1 | | 8121 SHELF 2 | APX 8000 DS3 CARD #21 SDN-AP-Q36DCWASH367C | RCV (IN) | BNC CONNECTOR | 3101 | DSX-3 BAY | RX (IN) | PANEL 8 JACK 23 | |

*FIG. 3.*

METHOD AND SYSTEM FOR LABELING COMMUNICATIONS CABLES

STATEMENT REGARDING FEDERALLY SPONSORED RESEARCH OR DEVELOPMENT

Not applicable.

CROSS-REFERENCE TO RELATED APPLICATIONS

Not applicable.

TECHNICAL FIELD

This invention relates to the field of computer programming. More particularly, the present invention provides a new and useful method for entering, modifying, storing, and retrieving cable labels.

BACKGROUND OF THE INVENTION

Communications networks and network systems are composed of a variety of network devices. These network devices are interconnected by cables. Historically, labeling these cables has been a slow, resource-intensive process that is prone to error. Prior-art labeling techniques suffer from a litany of shortcomings. In a first prior-art technique, labeling information is maintained separate from cable-descriptive information. Cable data, data related to a cable's source, destination, quality etc. is stored in an unstructured format. Thus, no method exists where cable tags are automatically generated from existing cable data. Another shortcoming of the prior art is that there is no way to enforce standard label content on cable tags. Pertinent info may be lost in creating the label. Also, labels may be illegible and abbreviations unclear.

One of the largest problems that exists in the prior art is that generating cables labels is currently time consuming. A technician must manually key in data to be printed on a label, irrespective of whether this data exits in other systems. Historically, there has been no standardized system or method of creating labels for cables used in the telecommunications industry. Human error in either re-typing the data into a label machine or hand-writing the data on a label is widespread and difficult to correct. The physical labels do not follow a standard format.

The present state of the art can be improved by providing a method for generating cable-labels in a more efficient and accurate manner.

SUMMARY OF THE INVENTION

The present invention solves at least the above problems by providing a system and method for electronically organizing cable-label information in a storage location accessible by multiple parties, such as a local technician and a remote engineer. The present invention bridges a gap in information flow by providing an electronic link for retrieval of the centrally-located label records, thus reducing operator-type human errors. The present invention has several practical applications in the technical arts including significantly reducing the time associated with creating cable labels, automating the cable-label-generation process, reducing mistakes in generating cables, and making label records available for future reuse.

In one aspect, the present invention provides a method and system for generating cable labels. The cable labels can be generated, modified, and deleted in digital format. A central data store is used to keep the labels for future use and for efficient retrieval by a user.

In another aspect, a system is provided for manipulating cable-label information that is stored in a centralized data store accessible by more than one user. This centralized data store allows label records to be added, modified, deleted, and/or transferred without possibility of human error and also allows the reuse of label records. A group of label records is stored in a storage device. Search criteria is received that is used to retrieve certain label records. Specific records are identified that correspond to the search criteria. Finally, a data stream is provided that, when rendered by a printing device, produces labels displaying content from the identified record (s) in a prescribed format.

In a further aspect, the present invention provides quality control for the physical labels and employs standards for the label content. Because the labels will all be printed on the same type of labeler, physical characteristics can be controlled and the content to be printed will follow the same format for each label.

In a final exemplary aspect, a system for printing labels is provided that includes a user interface connected to a storage component for receiving a search string and a label controller that receives the query result and converts the result into a predetermined format whereby the query result can be rendered on a printing device.

BRIEF DESCRIPTION OF THE SEVERAL VIEWS OF THE DRAWINGS

The present invention is described in detail below with reference to the attached drawing figures, wherein:

FIG. 3 is a portion of an illustrative cable-running list in accordance with an embodiment of the present invention.

DETAILED DESCRIPTION OF THE INVENTION

The present invention provides a system and method for managing, accessing, and printing cable-label records. Labels can be retrieved and printed without re-keying label content into a labeler or manually copying it onto a label. Multiple labels can be retrieved simultaneously and a prescribed format can be mandated to provide a consistent label format.

Various telecom technical terms are used throughout this disclosure. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-usable instructions—including data structures and program modules. Communications media include any information-delivery media.

Figure 1:
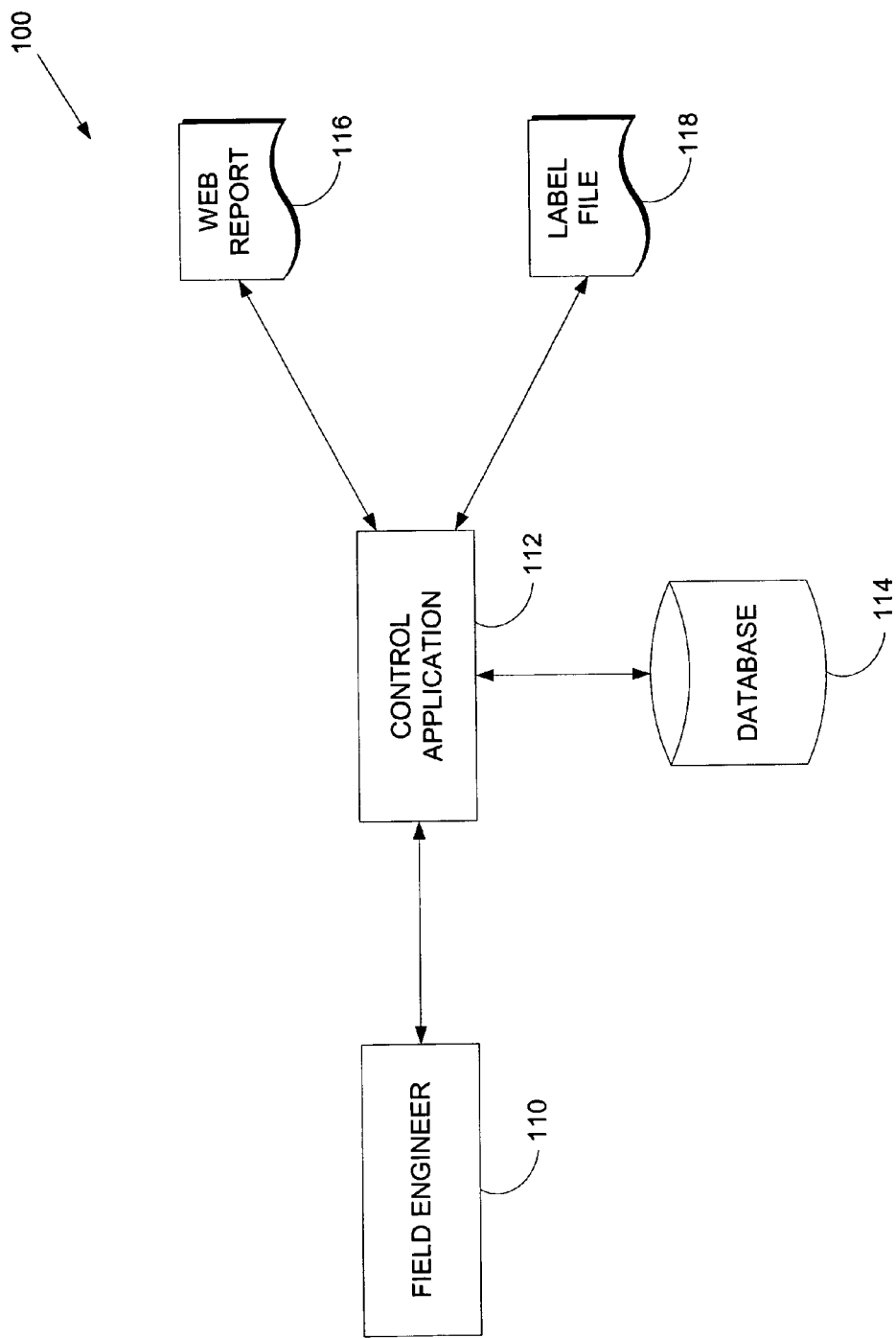
FIG. 1 is a block diagram illustrating an exemplary dataflow model in accordance with an embodiment of the present invention.

FIG. 1 is a block diagram illustrating an exemplary dataflow model 100 of the present invention and is referenced generally by the numeral 100. Dataflow model 100 illustrates data corresponding to a cable-label running list (CLRL) flowing between various components. A CLRL can be any assembly of data that contains information related to physical cables, all or a portion of which will be used to generate one or more cable labels. The format of a cable-label running list can take on a variety of forms and should not be construed a limitation of the present invention. Rather, any data file or data stream may be used to compose a cable-label running list, which contains data related to a cable, such as its destination, source, type, identification, purpose, etc. A portion of an exemplary cable-label running list is provided in FIG. 3. Dataflow model 100 depicts data flowing between a field engineer 110, a control application 112, a database 114, a web report 116 and a label file 118.

Field engineer 110 represents a remote user who needs to affix labels to one or more cables in the field. Control application 112 facilitates dataflow between the field engineer 110 and database 114 to produce either web report 116 and/or label file 118. Control application 112 can receive requests from field engineer 110 and gather data from database 114 to produce web report 116 or the label file 118 in an embodiment of the present invention.

Database 114 may be any collection of records, which can be data structured and organized in a way to quickly access and store information. Database interface 128 (FIG. 1A) includes finders that initiate the actual queries and retrieve label records consistent with those queries and can be any device capable of retrieving records from a database or other storage device.

In operation, field engineer 110 submits a query to control application 112 to retrieve cable-label information. Control application 112 receives the query submitted by field engineer 110 and facilitates a search of database 114 to retrieve matching records. Control application 112 can then produce a web report 116, which is preferably a web page that displays labeling data related to the specific cable running list submitted. Alternatively, control application 112 may output label file 118, which also contains cable-label data and can be inputted into a printer to print cable labels from label file 118.

Figure 1A:
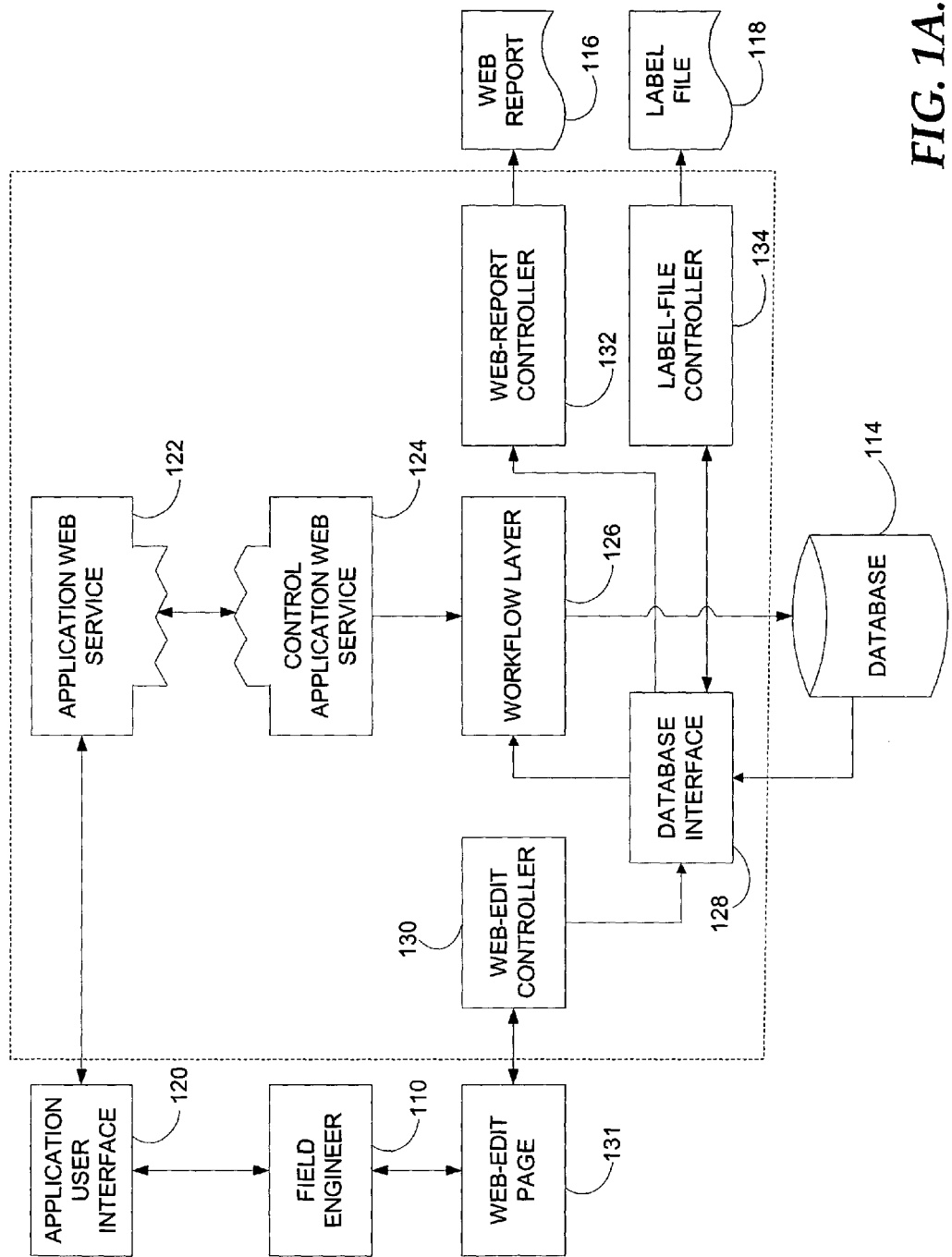
FIG. 1A is a block diagram illustrating the dataflow model of FIG. 1 in greater detail.

FIG. 1A illustrates in greater detail an exemplary flow diagram of the present invention. In a preferred embodiment, control application 112 is composed of an application user interface 120, an application web service 122, a control application web service 124, a control application workflow 126, a database interface 128, a web-edit controller 130, a web-report controller 132, and a label-file controller 134 arranged as shown. Those skilled in the art will appreciate that control application 112 may be composed of a variety of other subcomponents or of similar subcomponents with alternative names that accomplish the functionality described below.

The various modules that compose control application 112 should not be construed as limitations of the present invention; but rather as a preferred arrangement of modules to accomplish the functionality offered disclosed herein. Application user interface 120 offers a first way to receive input from field engineer 110. Application user interface 120 is not a web page. Rather, application user interface 120 can be a software application such as a productivity or utility application. An exemplary application user interface suitable for use in practicing the present invention includes MS Excel® offered by the Microsoft Corporation of Redmond, Wash.

Web services provide a mechanism for computers to talk to other computers using standard Internet-based protocols, especially XML. In the preferred embodiment, XML-based web services are used. XML-based web services make programmatic interactions between computer systems much faster, cheaper, and easier than previous distributed-computing approaches. Application web service 122 is used to communicate data from application user interface 120 to a workflow layer 126 via control application web service 124. Control application web service 124 is a web service that accepts any XML web service from any source, not limited to application user interface 120. Control application web service 124 manages retrieving information through database interface 128 and initiating the workflow for storing new or changed information via control workflow layer 126.

Database interface 128 provides domain-object information that represents cable-label running lists. Database interface 128 provides data to label-file controller 134 and web-report controller 132. Web-report controller 132 helps create a page that conforms to a prescribed standard. Using a prescribed standard allows the web report 116 to be formatted consistently. Thus, content format can be enforced by the present invention. Label-file controller 134 produces a file that is compatible with a printer or printing software of choice. Label-file controller 134 dictates the type of output that will be produced.

A second user interface 131 (such as a web edit page), provides an alternative method of interacting with field engineer 110. In a preferred embodiment, the second user interface takes the form of a page viewable by a browser. A browser includes any software product that translates digital bits into viewable data components. Exemplary browsers include INTERNET EXPLORER® offered by Microsoft Corporation of Redmond, Wash. and NETSCAPE NAVIGATOR® offered by Netscape Communications Corporation of Cupertino, Calif. Engineer 110 may use web edit page 131 to, among other things, make cable-information requests and to submit data-modification requests. Web edit page 131 interacts with control application 112 via web-edit controller 130.

Web-edit controller 130 manages page operations including retrieving information from database 114 and initiating control application workflow 126. Web-edit controller 130 can be any device that helps render user interface components in a browser. Web-edit controller 130 may be a subcomponent of another device, stand-along, or may be located in a computing device such as a file server. In one embodiment, web-edit controller 130 facilitates communication between web edit page 131 and workflow layer 126 by managing label-record information and/or query requests it receives and transmitting them to workflow layer 126.

Workflow layer 126 includes a set of instructions that when implemented impose a set of rules on system procedures. In one embodiment, workflow layer 126 directs label-record information and/or query requests it receives from web-edit controller 130 are stored in database 114.

Turning briefly to FIG. 3, an illustrative cable-running list is provided. Additional data fields may be added and not all fields shown are required. As show, exemplary information contained in a cable-label running list for various devices may include a variety of identifiers that describe, for instance, an item, cable type, number of runs, racks/location, equipment description, equipment designation, termination type and/or any applicable notes. The identifying information can be included for both the source of the cable run and its destination. In some embodiments a cable-label-running list is the same as a cable-running list. In other embodiments, a cable-running list is used as a source of information to generate a cable-label-running list, which contains a subset of data in a cable-running list. The list shown in FIG. 3 can be either a cable-running list or a cable-label running list.

In one embodiment the cable-label information can be stored in database 114 by operators other than field engineer 110. For example, a group of users may prepopulate database 114 with cable-label information related to many different labels so that when field engineer 110 needs to retrieve labeling information related to those cables, he or she may do so without having to re-key information.

Not having to re-key cable-label-content information is a significant improvement over the prior art, where a technician would need to key in labeling information on site. The information had to be keyed as many times and for as many different labels as needed. These labels also may not have been printed in a consistent format, but the labels of the present invention can be printed in a consistent format via label file 118. If field engineer 110 simply wants to view cable-labeling data, that is possible using web report 116.

Figure 2:
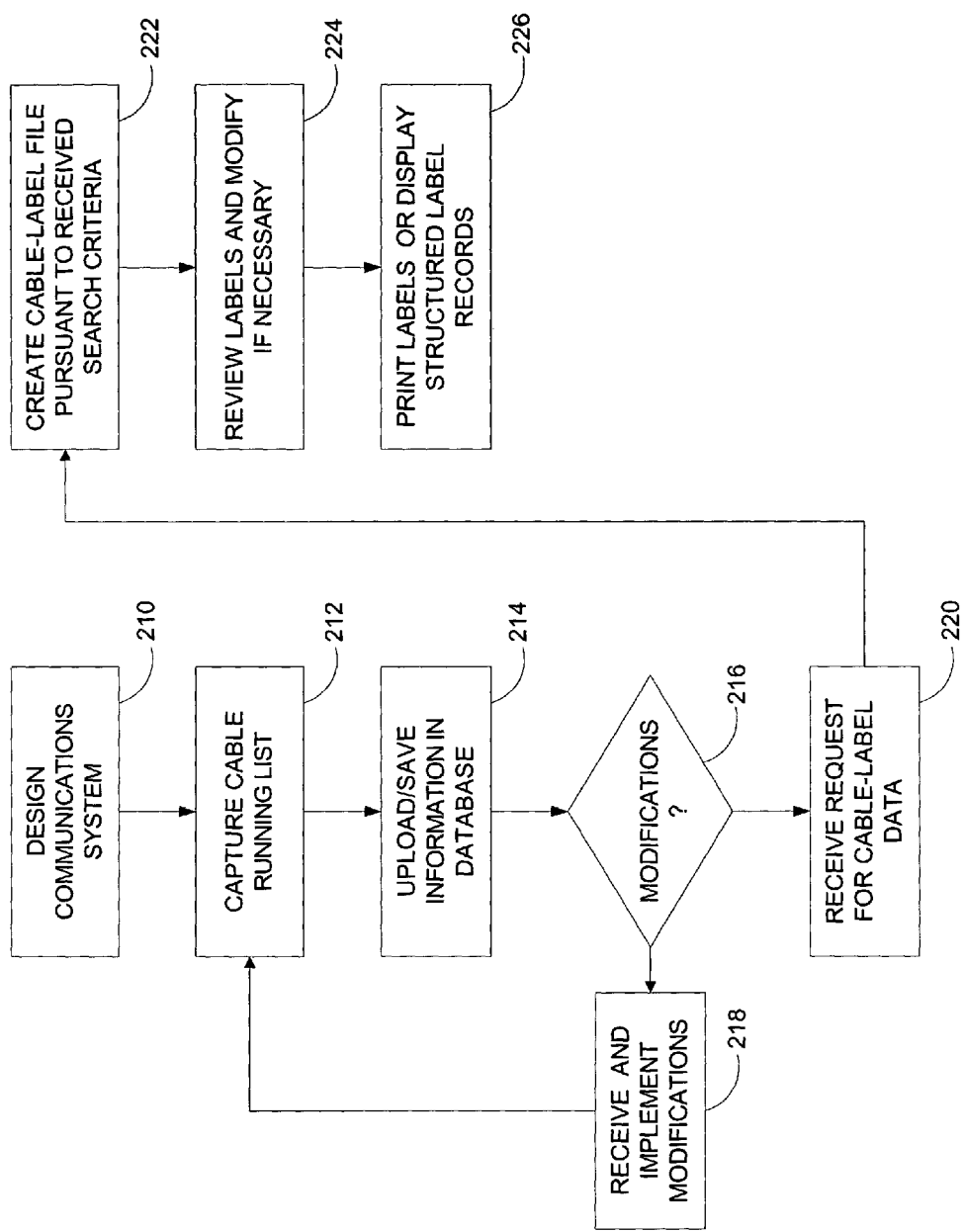
FIG. 2 is a flowchart illustrating a method for providing cable labels in accordance with an embodiment of the present invention.
Figure 2B:
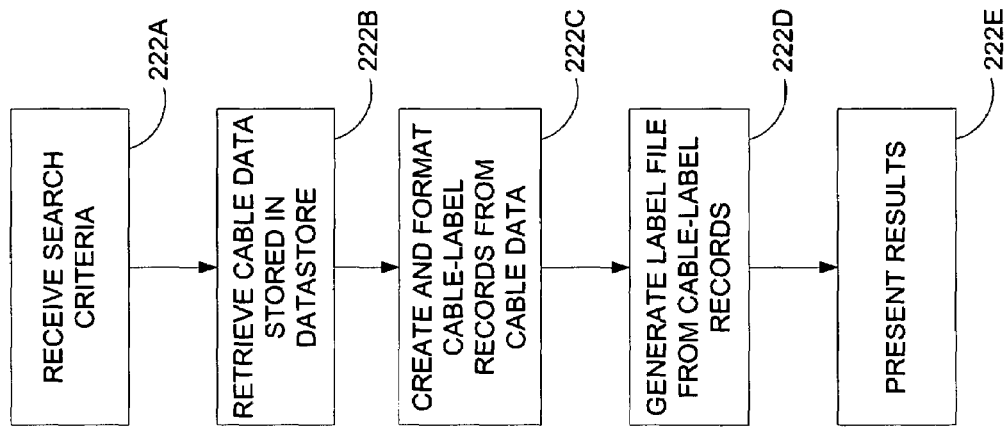
FIG. 2B is a flowchart illustrating a process for creating cable labels in greater detail.
Figure 2A:
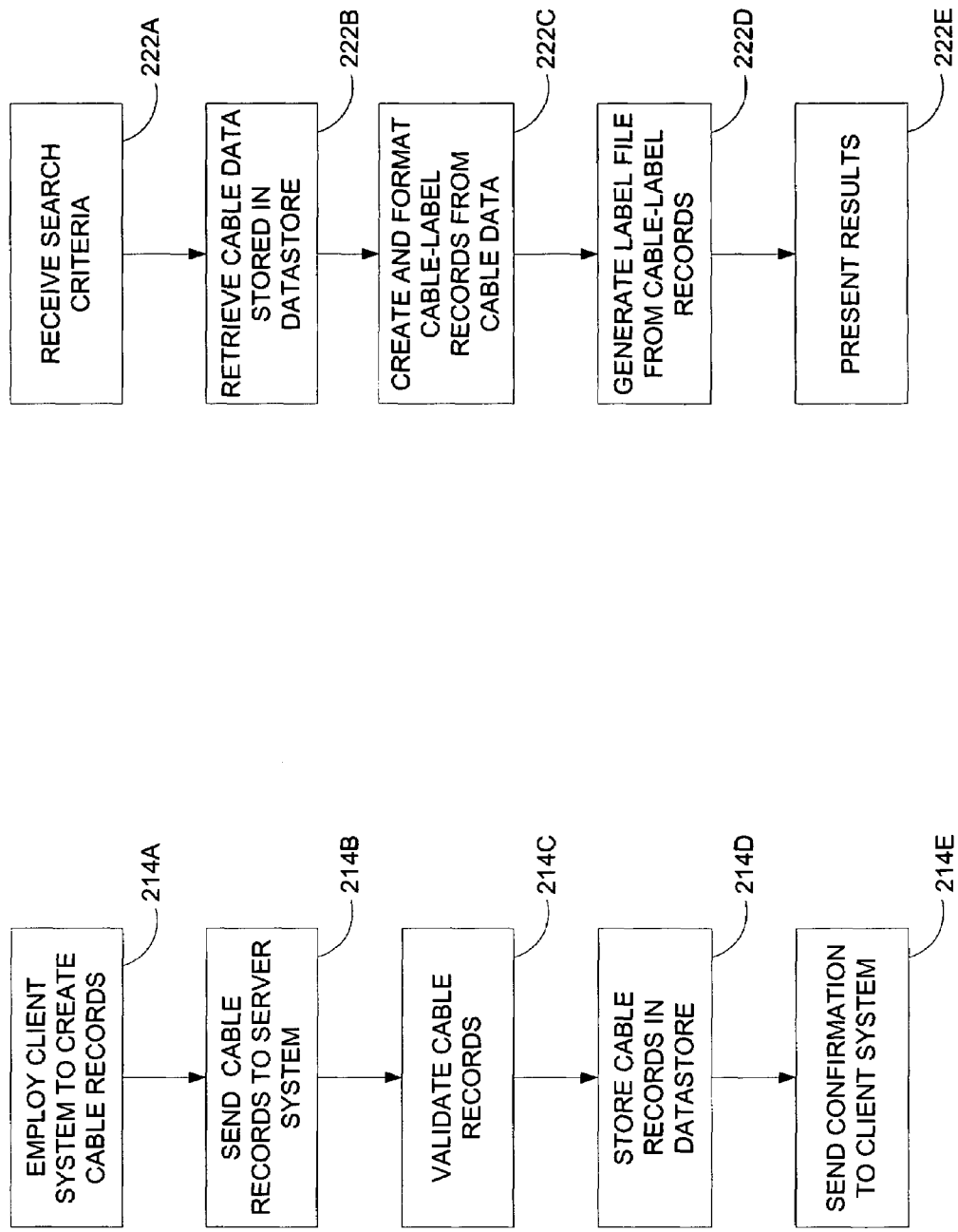
FIG. 2A is a flowchart illustrating an uploading process in greater detail.

FIG. 2A is a flowchart illustrating a method for providing cable labels in accordance with an embodiment of the present invention. Not all processes listed in FIG. 2 are required, nor is each step a required step. The various technologies depicted are provided for illustrative purposes that may include preprocessing or postprocessing steps that clarify various functional aspects offered by the present invention. At a step 210, a communications system is designed. Here, a communications system can be any system that requires cables: from residential home wiring to a city-wide communications network and beyond. When a system is designed, the various cables that need to be implemented are typically provided in schematic diagrams or by some other conventional means.

In a preferred embodiment, information related to some or all of the various cables is captured in a cable-label running list. A cable-label running list can take on a variety of forms, such as a database, a spreadsheet, or a text file. The cable-label-running-list data is captured at a step 212. The cable-label running list is then uploaded or saved to a data store such as database 114 at step 214. Any modifications that need to be made can be made in a cyclical step 218. By inputting this data into a remotely accessible repository, the data made available to remote users. Now cable-label data can be automatically generated from the cable-running-list data. At an exemplary step 220, a request is received to retrieve cable-label data. This request can come from an engineer in the field for example.

The request is typically received by a query submission that allows cable-label data to be retrieved at a step 222. In one embodiment, the data retrieved from step 222 is then imported into a cable-label file. The cable-label file, such as label file 118, can assume a variety of forms such as a text document, a word processing document, a database file, a spreadsheet file, a comma-separated-variable file, etc. This file includes information from the label record in database 114 that is to be printed on the label. Label file 118 should not be construed as limited to an actual file per se, but can be any output stream containing data. The data may include a stream of single characters or be composed of a series of data packets.

The cable-label data can then be printed at a step 226 or merely viewed and corrected at a step 228, whereby processing would return to updating the cable-label file and re-retrieving the updated data at a step 222.

The uploading/saving step 214 is illustrated in greater detail with respect to FIG. 2A. Turning now to FIG. 2A, a client system can create cable records at a step 214A. Using a client system to formulate data records is not essential. The records could be created directly at a server. But using a client system is expedient and efficient. The cable records include the various data items previously mentioned such as source and destination information. Such a client system can then send the records to a remotely accessible server system at a step 214B. A server system then receive the cable records and validates them records at a step 214C. Validating data decreases the likelihood of processing errors and offers a quick feedback mechanism to correct user input. If the data is not formatted correctly, or for some other reason, the data can be flagged for correction at this time. But, if the data is valid, then the server system preferably stores the cable-label records in a remotely accessible database such as database 114 at a step 214D. In a preferred embodiment the server system then sends a confirmation to the client system at a step 214E.

Retrieving cable-label information at a step 222 is illustrated in greater detail with reference to FIG. 2B. Turning now to FIG. 2B, control application 112 receives at a step 222A search criteria upon which to base a search for certain cable-label records stored in database 114. Control application 112 then retrieves cable-label information stored in database 114 based on the search criteria at a step 222B (FIG. 2B). In a preferred embodiment, the system then formats the cable records into structured cable-label records at a step 222C. Structuring the labeling data makes it easy to manipulate. At a step 222D, control application 112 generates a results file, such as label file 118 or web report 116. Reports can then be presented to a user at a step 222E.

As previously mentioned, FIG. 3 is an illustrative example of a cable running list, which can also be a cable-label running list. Label-content data is generated from this list. This list can take on a variety of forms and the form illustrated in FIG. 3 should not be construed as a limitation of the present invention. Rather, any type of file (text delimited, spreadsheet, etc) may be used. The data stored in the list can be correlated with label content.

As can be seen, the present invention and its equivalents are well-adapted to provide a new and useful method for labeling cables. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-storage media, having computer-usable instructions embodied thereon for performing a method of generating a cable-label file that is provided to a printing device capable of producing printed labels, the method comprising:
   receiving cable-description information identifying at least one cable from a remote user;
   capturing the received cable-description information into a cable-label running list;
   automatically validating the cable-label running list against a predefined format to remove processing errors, wherein upon recognizing a processing error, a feedback mechanism offers assistive input and flags the recognized processing error;
   dynamically updating a listing of cable-label records with the validated cable-label running list;
   receiving search criteria for one or more cable-label records;
   automatically identifying at least one cable-label record in the updated listing of cable-label records corresponding to the received search criteria;
   incident to receiving the search criteria for the one or more cable-label records, generating a cable-label file by reformatting the at least one identified cable-label record, wherein the generated cable-label file is structured to promote manual manipulation of content therein; and
   automatically providing the generated cable-label file to the printing device capable of producing printed labels, wherein the printed labels display the content of the generated cable-label file in a prescribed format.

2. The one or more computer-storage media of claim 1, wherein the search criteria include at least:
   a first search parameter; and
   a second search parameter.

3. The one or more computer-storage media of claim 2, wherein the cable-label file include content that is to be displayed on the printed labels.

4. The one or more computer-storage media of claim 3, wherein said content includes a plurality of identifiers indicating one of: a cable type, a number of runs, a racks description, racks location information, an equipment description, an equipment designation, a termination type and/or a textual note.

5. The one or more computer-storage media of claim 3, wherein identifying the at least one cable-label record comprises assembling a query from the first and second search parameters.

6. The one or more computer-storage media of claim 5, wherein identifying the at least one cable-label record further includes searching the updated listing of cable-label records against the assembled query.

7. The media of claim 5, wherein the cable-label file includes an output file.

8. The one or more computer-storage media of claim 1, wherein the predefined format includes at least one selection from the following:
   a binary file;
   an ADCII file; and
   a text file, including a delimiter.

9. A computer method for generating a cable-label file that is provided to a printing device capable of producing printed labels, the computer method comprising:
   receiving cable-description information identifying at least one cable from a remote user;
   capturing the received cable-description information into a cable-label running list;
   automatically validating the cable-label running list against a predefined format to remove processing errors, wherein upon recognizing a processing error, a feedback mechanism offers assistive input and flags the recognized processing error;
   dynamically updating a listing of cable-label records with the validated cable-label running list;
   receiving search criteria for retrieving one or more cable-label records;
   automatically identifying at least one cable-label record in the updated listing of cable-label records corresponding to received the search criteria;
   incident to receiving search criteria for retrieving one or more the cable-label records, generating a cable-label file by reformatting the at least one identified cable-label record, wherein the generated cable-label file is structured to promote manual manipulation of content therein; and
   automatically providing the generated cable-label file to the printing device capable of producing printed labels, wherein the printed labels display the content of the generated cable-label file in a prescribed format.

10. The computer method of claim 9, wherein receiving cable-description information comprises receiving indicia related to the at least one cable.

11. The computer method of claim 9, wherein said indicia includes a plurality of fields indicating one of: a cable type, a number of runs, a racks description, racks location information, an equipment description, an equipment designation, a termination type and/or a textual note.

12. The computer method of claim 11, wherein the search criteria includes:
   a first search parameter; and
   a second search parameter.

13. The computer method of claim 12, wherein identifying the at least one cable-label record comprises assembling a query from the first and second search parameters.

14. The computer method of claim 13, wherein identifying the at least one record further includes searching the updated listing of cable-label records against the assembled query.

* * * * *